United States Patent
Chen et al.

(10) Patent No.: US 10,579,437 B2
(45) Date of Patent: Mar. 3, 2020

(54) MIGRATING A LOGICAL PARTITION WITH A NATIVE LOGICAL PORT

(71) Applicant: International Business Machines Corporation, Armonk, NY (US)

(72) Inventors: Ping Chen, Austin, TX (US); Charles S. Graham, Rochester, MN (US); Yiwei Li, Austin, TX (US); Raghavendra Malapati, Bangalore (IN); Venu G. Potluri, Khammam (IN); Patricia Y. Wang, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 362 days.

(21) Appl. No.: 15/366,299

(22) Filed: Dec. 1, 2016

(65) Prior Publication Data

US 2018/0157537 A1 Jun. 7, 2018

(51) Int. Cl.
*G06F 9/50* (2006.01)
*G06F 9/455* (2018.01)
*G06F 3/06* (2006.01)

(52) U.S. Cl.
CPC .......... *G06F 9/5077* (2013.01); *G06F 3/067* (2013.01); *G06F 3/0617* (2013.01); *G06F 3/0647* (2013.01); *G06F 9/45558* (2013.01); *G06F 2009/4557* (2013.01)

(58) Field of Classification Search
CPC .... G06F 9/5077; G06F 9/45558; G06F 3/067; G06F 3/0617; G06F 3/0647; G06F 2009/4557
See application file for complete search history.

(56) References Cited

U.S. PATENT DOCUMENTS

| 7,693,811 B2 | 4/2010 | Adlung et al. |
| 8,645,974 B2 | 2/2014 | Armstrong et al. |
| 2008/0147887 A1 | 6/2008 | Freimuth et al. |

(Continued)

OTHER PUBLICATIONS

Cordero et al. ("IBM PowerVM Virtualization Introduction and Configuration", Jun. 2013) (Year: 2013).*

(Continued)

*Primary Examiner* — Francisco J Aponte
*Assistant Examiner* — Kevin X Lu
(74) *Attorney, Agent, or Firm* — Peter J. Edwards

(57) ABSTRACT

Migrating a logical partition with a native logical port including establishing in the target computing system a target VIOS that includes a virtual network interface controller (vNIC) server, the vNIC server of the target VIOS coupled for data communications to a first target virtual adapter; copying the logical partition including a vNIC client to the target computing system; starting the logical partition; establishing, by the vNIC client of the logical partition, data communications with the vNIC server of the target VIOS, including performing I/O data communications between the logical partition and the first target virtual adapter; establishing a second logical port in the logical partition on the target computing system, including coupling for I/O data communications the second logical port to a second target virtual adapter; and performing I/O data communications from the logical partition to the second target virtual adapter through the second logical port.

17 Claims, 7 Drawing Sheets

(56) References Cited

U.S. PATENT DOCUMENTS

| | | |
|---|---|---|
| 2010/0250824 A1 | 9/2010 | Belay |
| 2012/0042034 A1 | 2/2012 | Goggin et al. |
| 2012/0150816 A1* | 6/2012 | Pafumi ............... G06F 11/1441 707/679 |
| 2012/0151473 A1* | 6/2012 | Koch ................. G06F 9/45558 718/1 |
| 2012/0297379 A1* | 11/2012 | Anderson ........... G06F 9/45558 718/1 |
| 2012/0303594 A1* | 11/2012 | Mewhinney ........ G06F 11/1482 707/692 |
| 2013/0086298 A1 | 4/2013 | Alanis et al. |
| 2013/0254321 A1 | 9/2013 | Johnsen et al. |
| 2015/0052282 A1 | 2/2015 | Dong |

OTHER PUBLICATIONS

Mehta ("vNIC—Introducing a New PowerVM Virtual Networking Technology", Oct. 2015) (Year: 2015).*

Walsh et al. ("PowerVM Single Root I/O Virtualization: Fundamentals, Configuration, and Advanced Topic," www.ibm.com/developerworks/community/wikis/form/anonymous/api/wiki/61ad9cf2-c6a3-4d2c-b779-61ff0266d32a/page/1cb956e8-4160-4bea-a956-e51490c2b920/attachment/, Oct. 5, 2015) (Year: 2015).*

Bhosale et al. ("IBM Power Systems SR-IOV Technical Overview and Introduction", Jul. 2014) (Year: 2014).*

Microsoft, *SR-IOV VF Failover and Live Migration Support*, <https://msdn.microsoft.com/windows/hardware/drivers/network/sr-iov-vf-failover-and-live-migration-support> (online), printed Jun. 15, 2016, 2 pages.

Appendix P; List of IBM Patent or Applications Treated as Related, Sep. 17, 2019, 2 pages.

U.S. Appl. No. 16/534,696, to Chen et al., entitled, Migrating a Logical Partition With a Native Logical Port, assigned to International Business Machines Corporation, 34 pages, filed Aug. 7, 2019.

* cited by examiner

US 10,579,437 B2

MIGRATING A LOGICAL PARTITION WITH A NATIVE LOGICAL PORT

BACKGROUND

Field of the Invention

The field of the invention is data processing, or, more specifically, methods, apparatus, and products for migrating a logical partition with a native logical port.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for migrating a logical partition with a native logical port are disclosed in this specification. Migrating a logical partition with a native logical port includes establishing in the target computing system a target VIOS that includes a virtual network interface controller (vNIC) server, the vNIC server of the target VIOS coupled for data communications to a first target virtual adapter; copying the logical partition including a vNIC client to the target computing system; starting the logical partition on the target computing system; establishing, by the vNIC client of the logical partition, data communications with the vNIC server of the target VIOS through the hypervisor of the target computing system, including performing I/O data communications between the logical partition and the first target virtual adapter; establishing a second logical port in the logical partition on the target computing system, including coupling for I/O data communications the second logical port to a second target virtual adapter; and performing I/O data communications from the logical partition to the second target virtual adapter through the second logical port.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
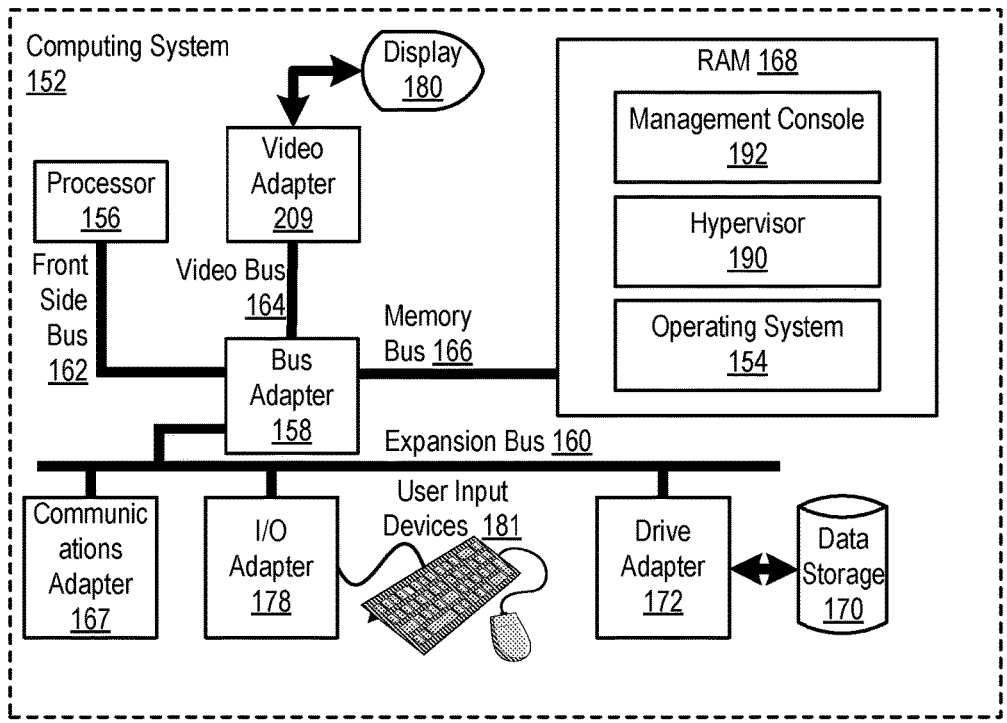
FIG. 1 sets forth a block diagram of an example system configured for migrating a logical partition with a native logical port according to embodiments of the present invention.

Exemplary methods, apparatus, and products for migrating a logical partition with a native logical port in accordance with the present invention are described with reference to the accompanying drawings, beginning with FIG. 1. FIG. 1 sets forth a block diagram of automated computing machinery comprising an exemplary computing system (152) configured for migrating a logical partition with a native logical port according to embodiments of the present invention. The computing system (152) of FIG. 1 includes at least one computer processor (156) or 'CPU' as well as random access memory (168) (RAM') which is connected through a high speed memory bus (166) and bus adapter (158) to processor (156) and to other components of the computing system (152).

Stored in RAM (168) is an operating system (154), a hypervisor (190), and a management console (192). Operating systems useful in computers configured for migrating a logical partition with a native logical port according to embodiments of the present invention include UNIX™, Linux™, Microsoft XP™, AIX™, IBM's i5/OS™, and others as will occur to those of skill in the art. The operating system (154) in the example of FIG. 1 is shown in RAM (168), but many components of such software typically are stored in non-volatile memory also, such as, for example, on a disk drive (170).

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for migrating a logical partition with a native logical port according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for migrating a logical partition with a native logical port according to embodiments of the present invention include modems for wired dial-up communications, Ethernet (IEEE 802.3) adapters for wired data communications, and 802.11 adapters for wireless data communications.

Figure 2:
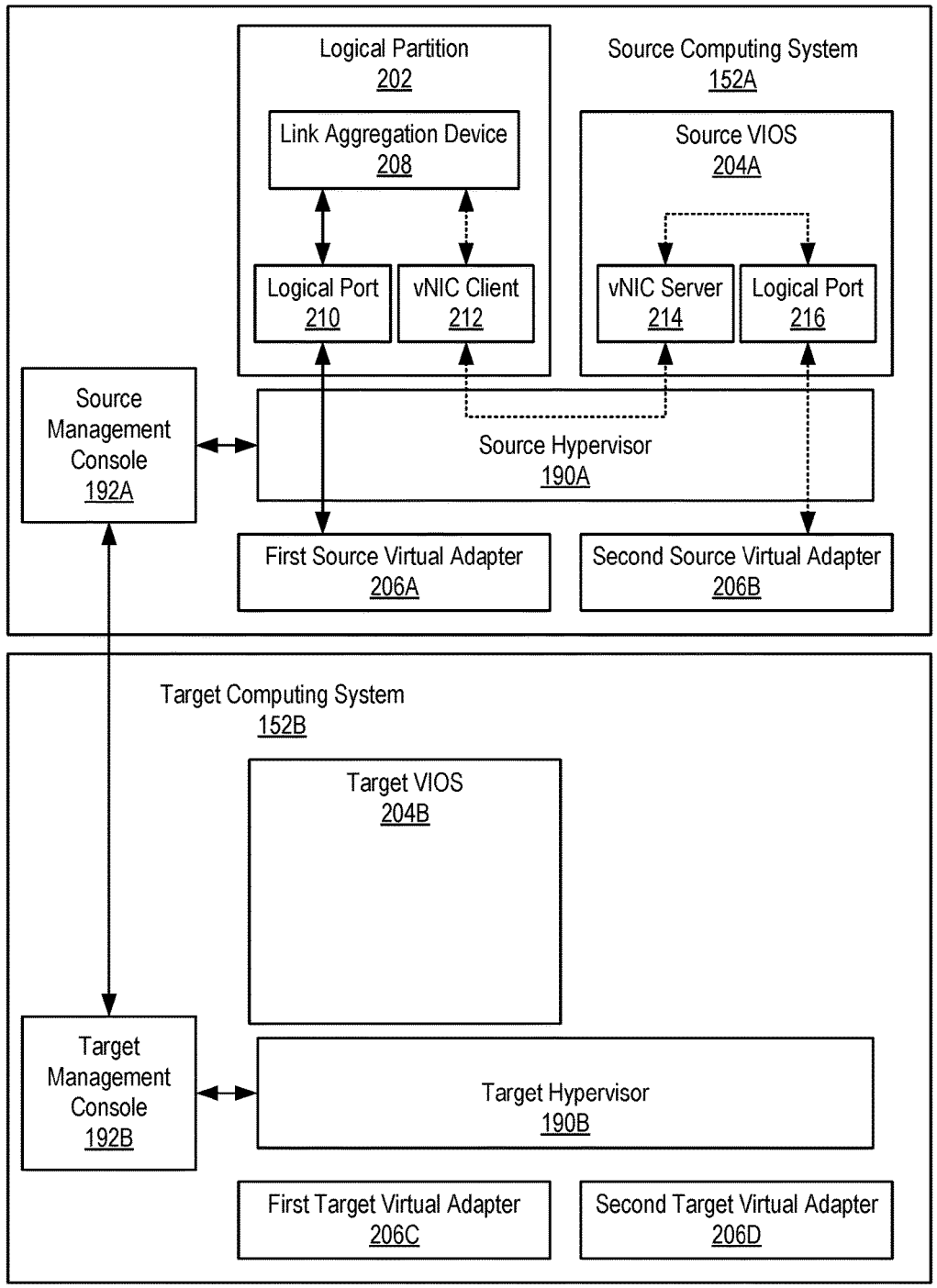
FIG. 2 sets forth a block diagram for migrating a logical partition with a native logical port according to embodiments of the present invention.

FIGS. 2 through 5 show different stages in the process of migrating a logical partition with a native logical port. FIG. 2 shows two computing systems (source computing system (152A), target computing system (152B)). As shown in FIG. 2, the source computing system (152A) includes a source management console (192A), a logical partition (202), a source VIOS (204A), a source hypervisor (190A), and two source virtual adapters (first source virtual adapter (206A), second source virtual adapter (206B)). The logical partition (202) includes a link aggregation device (208), a logical port (210), and a virtual network interface controller (vNIC) client (212). The source VIOS (204A) includes a vNIC server (214) and a logical port (216). The target computing system (152B) includes a target management console (192B), a target VIOS (204B), a target hypervisor (190B), and two target virtual adapters (first target virtual adapter (206C), second target virtual adapter (206D)). Although two management consoles are shown, a single management console may be utilized across both computing systems, or a management console may instruct a hypervisor on another computing system through the local management console. Although FIGS. 2 through 5 discuss separate virtual adapters, the logical port (210) on the logical partition (202) and the logical port (216) on the source VIOS (204A) may be communicatively coupled to the same source virtual adapter, or may each be coupled to virtual functions on the same virtual adapter.

The logical partition (202) is an isolated execution environment accessible and configurable by a operator. The logical partition (202) may be assigned a subset of the resources of the source computing system (152A), such as processor and memory resources. The logical partition (202) may also be referred to as virtual machine.

The logical partition (202) may also be provided access to virtual adapters, such as the first source virtual adapter (206A), the second source virtual adapter (206B), the first target virtual adapter (206C), and the second target virtual adapter (206D)). The virtual adapters may be physical I/O adapters with functionality to interact with the logical ports (logical port (210), logical port (216)). The virtual adapters may be single root input/output virtualization (SR-IOV) adapters, and may provide virtual functions to a number of logical partitions. The virtual function of the virtual adapter exposes adapter controls and access to the logical partition (202) (via the logical port (210)). The virtual adapters may be, for example, a physical NIC with SR-IOV virtual function capabilities, and the logical ports may be SR-IOV virtual function device drivers.

The source VIOS (204A) provides support functions for the logical partition (202). The source VIOS (204A) is an execution environment that hosts server applications in support of the logical partition (202). The source VIOS (204A) hosts a logical port (216) communicatively coupled to a virtual function of the second source virtual adapter (206B). The source VIOS (204A) also includes a vNIC server (214), a virtual device with the capability to send and receive data packets (or data pointers) from the vNIC client (212) and post receipt buffers for incoming data. The vNIC server (214) and the logical port (216) are communicatively coupled through the VIOS (204A).

The logical partition (202) includes a vNIC client (212), a virtual device with capability to send and receive data packets (or data pointers) from the vNIC server. The source hypervisor (190A) directs communications between the vNIC client (212) and the vNIC server (214), and between the logical ports and the virtual adapters. The vNIC client (212) may be configured with similar or the same attributes as the logical port (210).

The link aggregation device (208) provides a single interface through which the logical partition (202) performs I/O operations. The logical partition (202) may interact with the link aggregation device (208) in the same manner regardless of whether the I/O operations are transmitted utilizing the logical port (210) or the vNIC client (212). The link aggregation device (208) may attempt to execute operations using the logical port (210), if available. If the logical port (210) is not available, then the link aggregation device (208) may utilize the vNIC client (212).

The link aggregation device (208) may be automatically configured by the management console on top of the logical port (210) in response to the operator of the logical partition (202) assigning a native logical port (210) to the logical partition (202). The link aggregation device (208) may be configured, for example, by sending a "mkdev" command over a remote management console connection to create a link aggregation device. The logical port (210) may be native in that the logical port is specific to a virtual adapter or computing system, and may not be migrated with the logical partition.

The data path from link aggregation device (208), through the vNIC client (202), vNIC server (214), logical port (216), to the second source virtual adapter (206B) may require greater overhead costs in terms of resources and efficiency as compared to the data path from the aggregation device (208), through the logical port (210), to the first source virtual adapter (206A). Therefore, the data path through the source VIOS (204A) may act as a failover for the more direct data path to the first source virtual adapter (206A).

Each management console (source management console (192A), target management console (192B)) is logic within the computing system that interacts with the hypervisors to manage the logical partition (202). The management console includes functionality to configure elements within the logical partition, such as the link aggregation device (208), logical port (210) and vNIC client (212). The management console also includes functionality to configure elements within the VIOS, such as the vNIC server (214) and the logical port (216).

When the logical partition (202) is initially configured, an option is provided to allow the logical partition to be mobile, in that the logical partition may be migrated to a different computing system and/or a different hypervisor. If the mobility option is selected, three options for mobility configuration are presented to the operator of the logical partition (202). In the first option, a vNIC is automatically configured with the logical port in the logical partition. In the second option, the vNIC is automatically configured with the logical port, but at the point that migration of the logical partition is initialized. In the third option, the user (i.e., operator of the logical partition) is provided an opportunity to manually configure the vNIC with the logical port prior to migration.

As depicted in FIG. 2, a logical partition (202) is executing on the source hypervisor (190). The logical port (210) and first source virtual adapter (206A) are the primary I/O data path. The vNIC client (212) has been created in the logical partition (202) and is communicatively coupled, via the source hypervisor (190A) to the vNIC server (214). The vNIC client (212) and the vNIC server (214) are the backup I/O data path. Depending upon the option selected by the logical partition operator, the vNIC client (212) is created in the logical partition automatically at initialization of the logical partition (before migration), automatically during migration (e.g., as an initial step of migration), or in response to a configuration instruction (including parameters) from the logical partition operator.

Figure 3:
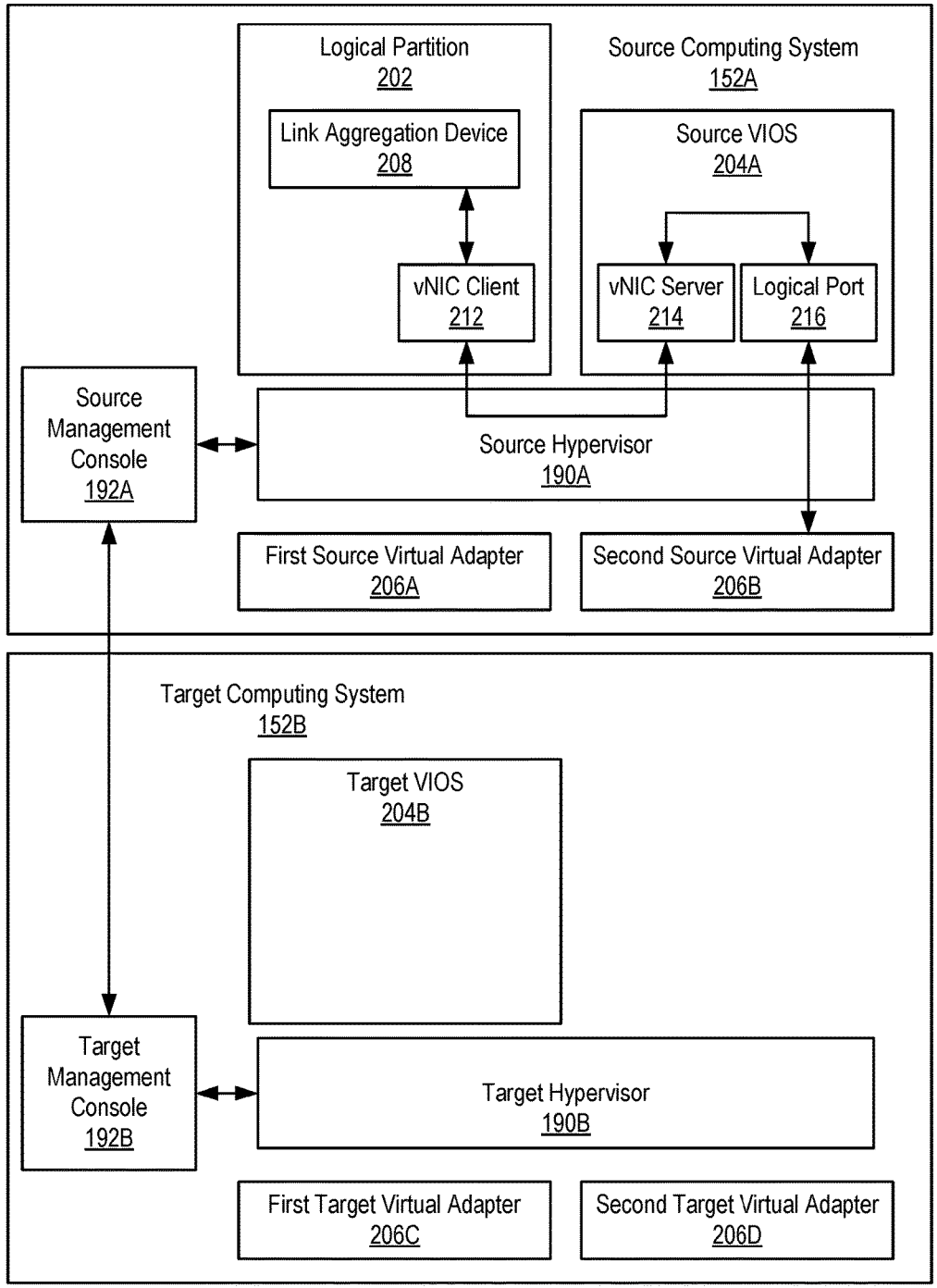
FIG. 3 sets forth a block diagram for migrating a logical partition with a native logical port according to embodiments of the present invention.

FIG. 3 shows a subsequent state of the source computing system (152A) and target computing system (152B) at a point after the state depicted in FIG. 2. FIG. 3 shows the logical partition (202) in the process of migration. The active logical port (210) has been deconfigured. Deconfiguring the logical port (210) removes the logical port from the logical partition (202) prior to migration. The link aggregation device (208), detecting that the local port (210) is no longer available, utilizes the vNIC client (212) for all I/O operations previously handled by the logical port (210). The logical partition (202) is then paused and copied to the target computing system (152B).

The native logical port (210) on the source computing system (152A) may be a physical I/O device. The physical I/O state of the logical port (210) may be maintained by partition firmware, which may not be recreated on another system. As a result, the native logical port (210) on the source computing system (152A) may be deconfigured prior to migration.

Figure 4:
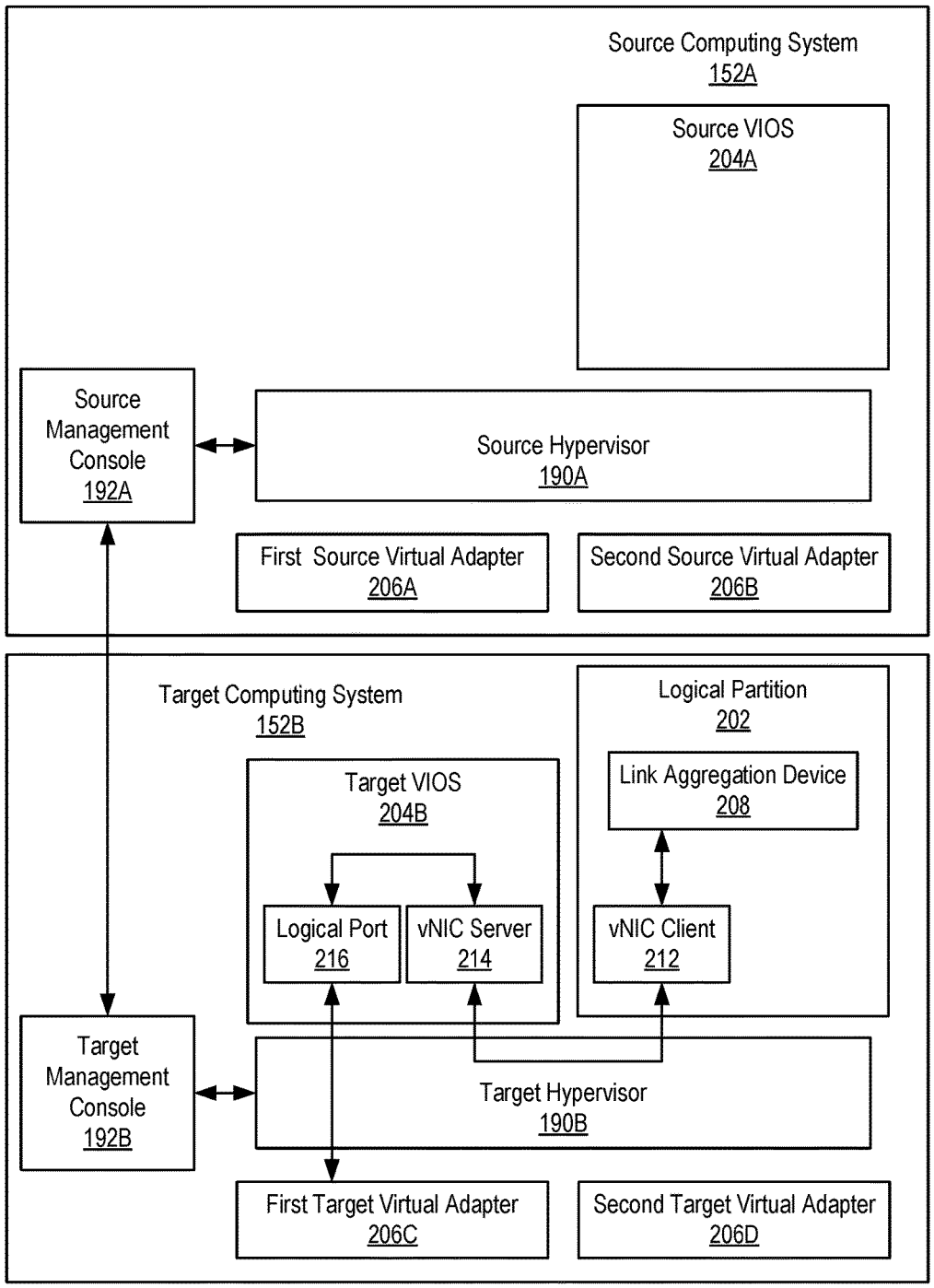
FIG. 4 sets forth a block diagram for migrating a logical partition with a native logical port according to embodiments of the present invention.

FIG. 4 shows a subsequent state of the source computing system (152A) and target computing system (152B) at a point after the state depicted in FIG. 3. FIG. 4 shows the logical partition (202) having been copied to the target computing system (152B). The target VIOS (204B) has been configured with a vNIC server (214) and a logical port (216). The vNIC server (214) and a logical port (216) may include the same configuration as the corresponding components on the source VIOS (204) (in FIGS. 2 and 3). Alternatively, the components may be configured with new settings appropriate for the connection to the first target virtual adapter (206C) and target hypervisor (190B).

Upon restarting, the vNIC client (212) is communicatively coupled to the vNIC server (214) via the target hypervisor (190B). The link aggregation device (208) within the logical partition (202) detects that there is no logical port available, and that the vNIC client (212) is available for I/O operations. The vNIC client (212) data path to the first target virtual adapter (206C) is used by the link aggregation device (208) as the primary data path.

Figure 5:
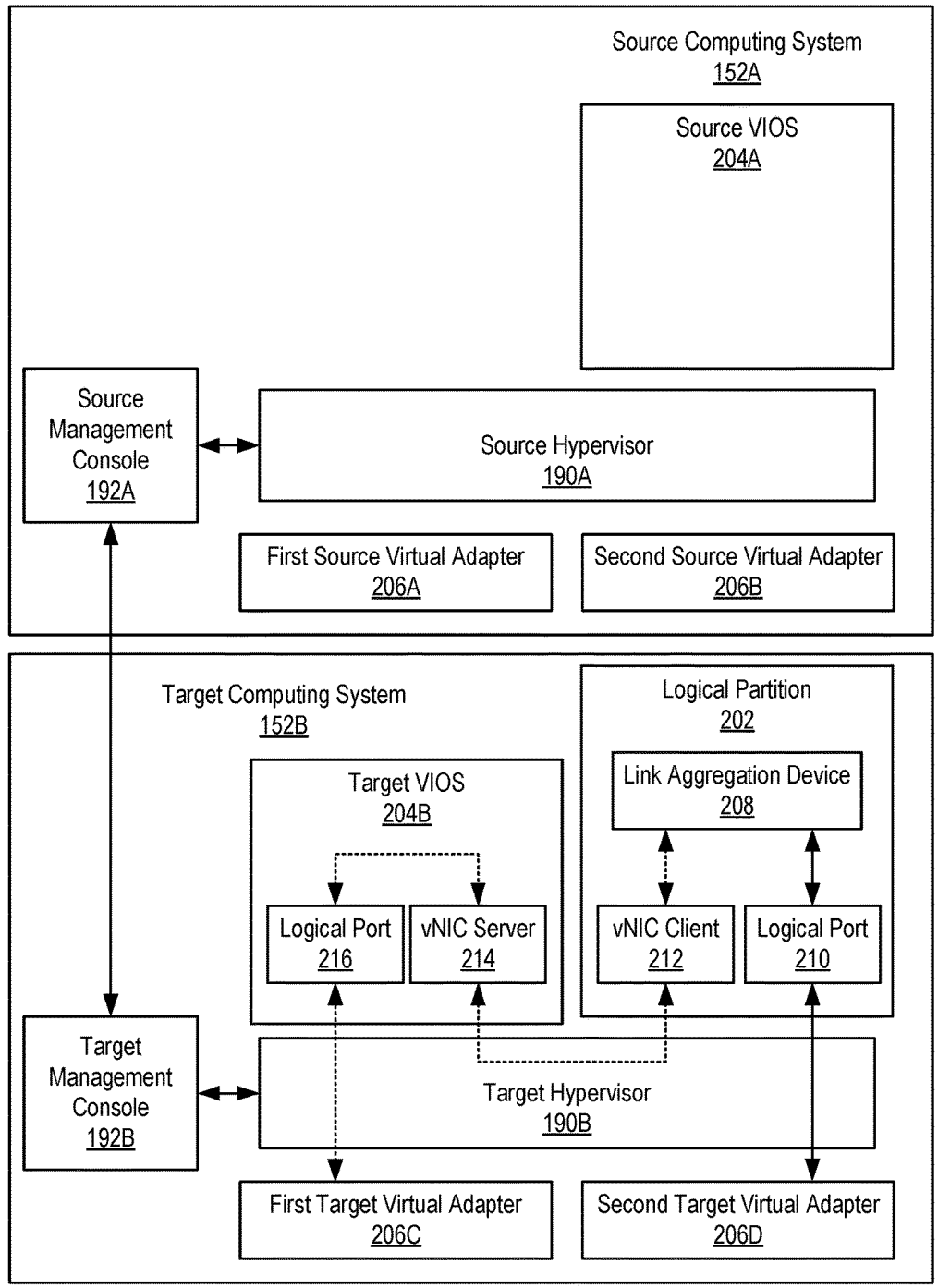
FIG. 5 sets forth a block diagram for migrating a logical partition with a native logical port according to embodiments of the present invention.

FIG. 5 shows a subsequent state of the source computing system (152A) and target computing system (152B) at a point after the state depicted in FIG. 4. FIG. 5 shows the logical partition (202) once a new logical port (210) has been initialized. The new logical port (210) is a fully reconfigured logical port, and may include the same or a similar configuration as the deconfigured logical port on the source computing system (152A). Alternatively, the new logical port (210) may be configured with entirely new parameters, appropriate for operation with the second target virtual adapter (206D). The new logical port (210) may be configured with parameters received from the operator of the logical partition (202).

Once the link aggregation device (208) determines the new logical port (210) has been created, the link aggregation device (208) utilizes the new logical port (210) and second target virtual adapter (206D) as the primary data path. The vNIC client (212) is then utilized as the backup data path. Alternatively, the vNIC client (212) may be removed by the management console.

Figure 6:
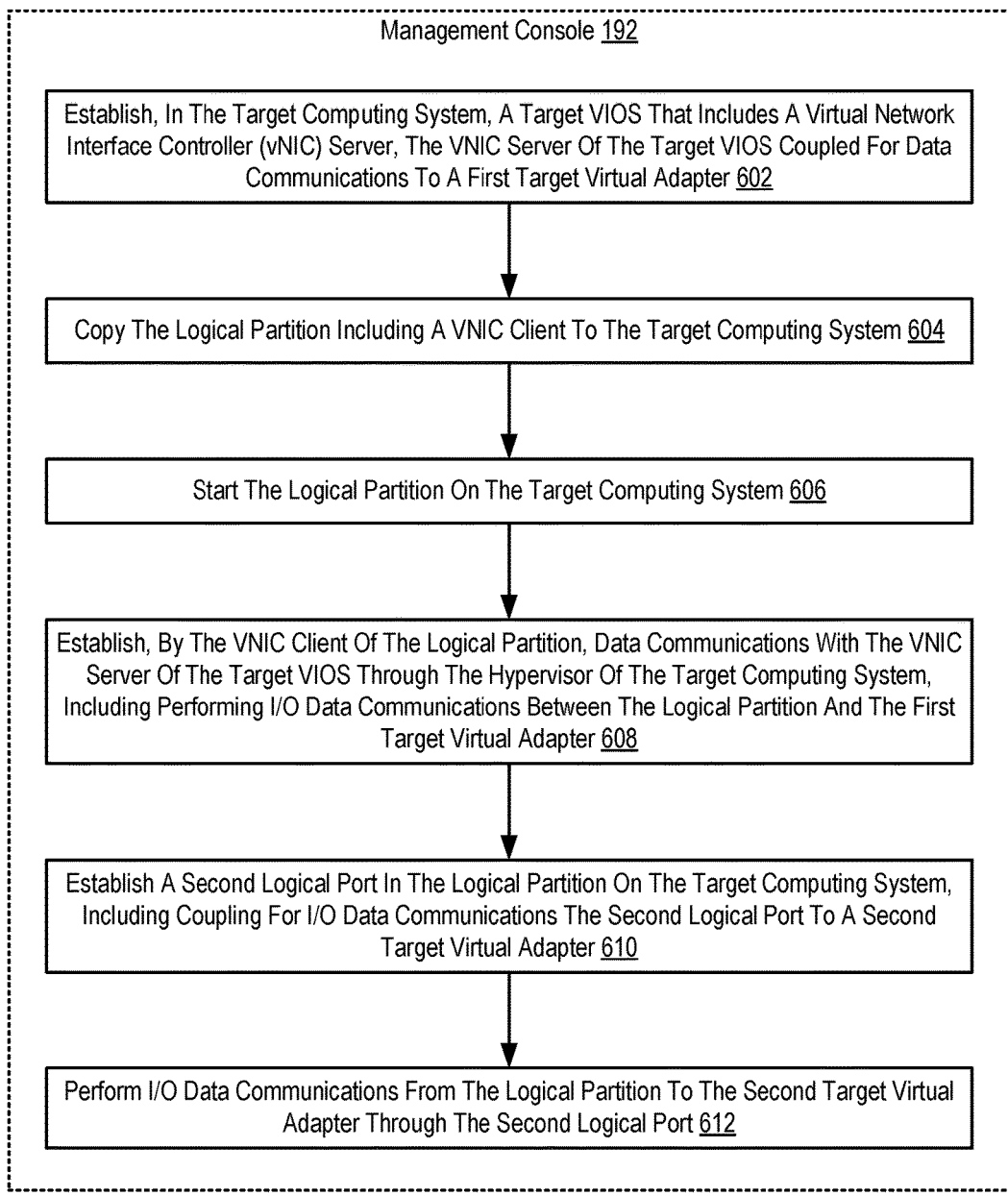
FIG. 6 sets forth a flow chart illustrating an exemplary method for migrating a logical partition with a native logical port according to embodiments of the present invention.

For further explanation, FIG. 6 sets forth a flow chart illustrating an exemplary method for migrating a logical partition with a native logical port according to embodiments of the present invention. The method of FIG. 6 includes establishing (602), in the target computing system, a target VIOS that includes a virtual network interface controller (vNIC) server, the vNIC server of the target VIOS coupled for data communications to a first target virtual adapter. Establishing (602), in the target computing system, a target VIOS that includes a virtual network interface controller (vNIC) server, the vNIC server of the target VIOS coupled for data communications to a first target virtual adapter may be carried out by a management console (192) instantiating a vNIC server in the VIOS via a hypervisor. The management console (192) may establish the target VIOS based on parameters received by the operator of the logical partition. Establishing (602), in the target computing system, the target VIOS may be performed at some point prior to the preparation of the migration of the logical partition, including during the establishment of the target computing system and target hypervisor.

The method of FIG. 6 also includes copying (604) the logical partition including a vNIC client to the target computing system. Copying (604) the logical partition may include instantiating a vNIC client in the logical partition as an active backup device for the first logical port, wherein the vNIC client is coupled through the hypervisor of the source computing system to a vNIC server in the source VIOS, and wherein the vNIC server is coupled for I/O data communications to a second source virtual adapter; decoupling the first logical port from the first source virtual adapter, wherein the vNIC client maintains I/O data communications for the logical partition responsive to the decoupling; and pausing the logical partition on the source computing system.

The method of FIG. 6 also includes starting (606) the logical partition on the target computing system. Starting (606) the logical partition on the target computing system may be carried out by executing a startup sequence for an operating system of the logical partition. Starting (606) the logical partition may include restarting the logical partition from a pause state entered into on the source computing system from which the logical partition was copied.

The method of FIG. 6 also includes establishing (608), by the vNIC client of the logical partition, data communications with the vNIC server of the target VIOS through the hypervisor of the target computing system, including performing I/O data communications between the logical partition and the first target virtual adapter. Establishing (608), by the vNIC client of the logical partition, data communications with the vNIC server of the target VIOS through the hypervisor of the target computing system, including performing I/O data communications between the logical partition and the first target virtual adapter may be carried out by the link aggregation device detecting that no logical port has been configured on the logical partition. In response, the link aggregation device utilizes the vNIC client to establish a connection, via the hypervisor, with the vNIC server.

The vNIC server may be communicatively coupled, within the target VIOS, to a logical port on the VIOS. The logical port on the VIOS may then be utilized for I/O data communications with the first target virtual adapter. This failover data path may be utilized by the link aggregation device upon resuming the logical partition after migration and until the link aggregation device detects the availability of a direct data path using a logical port on the logical partition. FIG. 4 shows the results of steps 602, 604, 606, and 608.

The method of FIG. 6 also includes establishing (610) a second logical port in the logical partition on the target computing system, including coupling for I/O data communications the second logical port to a second target virtual adapter. Establishing (610) a second logical port in the logical partition on the target computing system, including coupling for I/O data communications the second logical port to a second target virtual adapter may be carried out by configuring the second logical port with the same parameters as a previously deconfigured logical port on the logical partition before migration. Alternatively, the second logical port may be configured with parameters (e.g., physical port, capacity, etc.) received from the operator of the logical partition.

The method of FIG. 6 also includes performing (612) I/O data communications from the logical partition to the second target virtual adapter through the second logical port. Performing (612) I/O data communications from the logical partition to the second target virtual adapter through the second logical port may be carried out by the link aggregation device utilizing the second logical port for I/O data communications with the second target virtual adapter, such as network data packets. FIG. 5 shows the results of steps 610 and 612.

Figure 7:
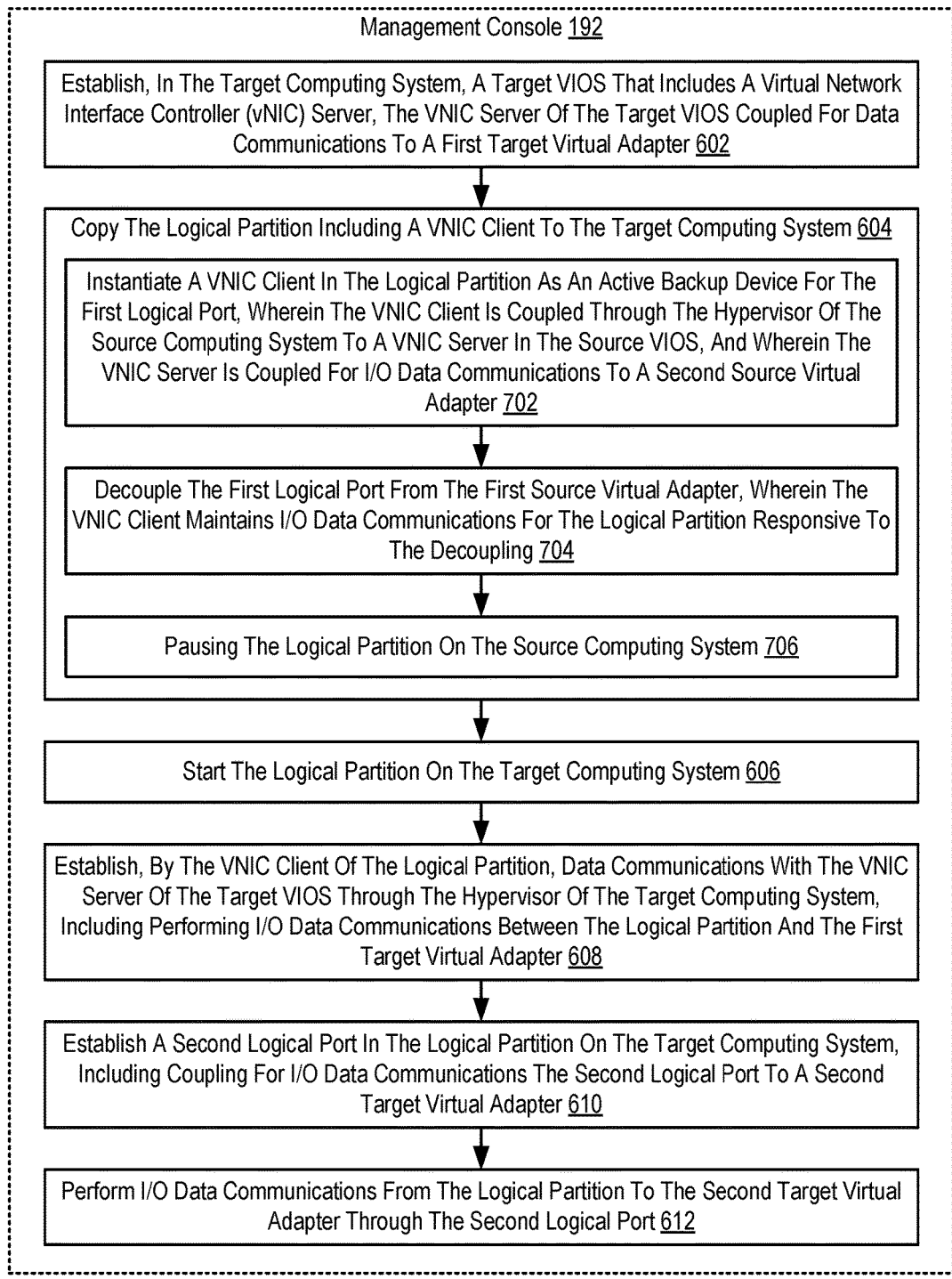
FIG. 7 sets forth a flow chart illustrating an exemplary method for migrating a logical partition with a native logical port according to embodiments of the present invention.

For further explanation, FIG. 7 sets forth a flow chart illustrating an exemplary method for migrating a logical partition with a native logical port according to embodiments of the present invention that includes establishing (602) in the target computing system a target VIOS that includes a virtual network interface controller (vNIC) server, the vNIC server of the target VIOS coupled for data communications to a first target virtual adapter; copying (604) the logical partition including a vNIC client to the target computing system; starting (606) the logical partition on the target computing system; establishing (608), by the vNIC client of the logical partition, data communications with the vNIC server of the target VIOS through the hypervisor of the target computing system, including performing I/O data communications between the logical partition and the first target virtual adapter; establishing (610) a second logical port in the logical partition on the target computing system, including coupling for I/O data communications the second logical port to a second target virtual adapter; and performing (612) I/O data communications from the logical partition to the second target virtual adapter through the second logical port.

The method of FIG. 7 differs from the method of FIG. 3, however, in that copying (604) the logical partition including a vNIC client to the target computing system includes instantiating (702) a vNIC client in the logical partition as an active backup device for the first logical port, wherein the vNIC client is coupled through the hypervisor of the source computing system to a vNIC server in the source VIOS, and wherein the vNIC server is coupled for I/O data communications to a second source virtual adapter; decoupling (704) the first logical port from the first source virtual adapter, wherein the vNIC client maintains I/O data communications for the logical partition responsive to the decoupling; and pausing (706) the logical partition on the source computing system.

Instantiating (702) a vNIC client in the logical partition as an active backup device for the first logical port, wherein the vNIC client is coupled through the hypervisor of the source computing system to a vNIC server in the source VIOS, and wherein the vNIC server is coupled for I/O data communications to a second source virtual adapter may be carried out by the management console (192) issuing a command to the logical partition to add the vNIC client to the link aggregation device as a backup data path. FIG. 2 shows the results of step 702.

The vNIC client may be instantiated and configured automatically before migration with attributes from the first logical port. The vNIC client may be created when the user first assigns a logical port to the logical partition. The vNIC client may operate as a failover data path during the operation of the logical partition, and outside of the migration process. The operator of the logical partition may select certain parameters for the vNIC client, such as the adapter physical port and VIOS.

The vNIC client may be instantiated and configured automatically during migration with attributes from the first logical port. The instantiation and configuration may be an initial step of the migration process. As the management console begins migration, the management console may automatically create the vNIC client on the logical partition and communicatively couple the vNIC client to a vNIC server in a VIOS on the source computing system. Once migration is complete, the vNIC client may be deconfigured on the logical partition.

The vNIC client may be instantiated and configured based on configuration instructions received from the operator of the logical partition, and comprising attributes for the vNIC client. During the operation of the logical partition, including just prior to migration, the operator of the logical partition may instantiate and configure a vNIC client as a failover data path from the link aggregation device. The operator of the logical partition may also deconfigure the vNIC client once the vNIC client data path is no longer required.

Decoupling (704) the first logical port from the first source virtual adapter, wherein the vNIC client maintains I/O data communications for the logical partition responsive to the decoupling may be carried out by deconfiguring the first logical port. Upon detecting that the first logical port is no longer available, the link aggregation device on the logical partition utilizes the vNIC client data path to the second source virtual adapter. The first logical port may be a native logical port, and may therefore not be migrated to the target computing device. FIG. 3 shows the results of step 704.

Pausing (706) the logical partition on the source computing system may be carried out by initiating a shutdown or suspend process on the logical partition. As part of the logical partition pausing, the link aggregation device and vNIC client are also paused within the logical partition.

In view of the explanations set forth above, readers will recognize that the benefits of migrating a logical partition with a native logical port according to embodiments of the present invention include:

Improving the operation of a computer system by enabling a logical partition with a native logical port to be migrated to another hypervisor and/or another computing system, increasing the functionality of the computing systems.

Improving the operation of a computer system by providing a failover data path for logical partitions, increasing the reliability of the operation of the logical partitions.

Improving the operation of a computer system by enabling efficient migration of logical partitions, increasing the agility and configurability of computing systems hosting logical partitions.

Exemplary embodiments of the present invention are described largely in the context of a fully functional computer system for migrating a logical partition with a native logical port. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of migrating a logical partition with a native logical port from a source computing system to a target computing system, wherein the source computing system includes a hypervisor that supports the logical partition and a source virtual I/O server (VIOS), the logical partition includes a first logical port coupled for I/O data communications to a first source virtual adapter, and the method comprises:

establishing in the target computing system a target VIOS that includes a virtual network interface controller (vNIC) server, the vNIC server of the target VIOS coupled for data communications to a first target virtual adapter;

copying the logical partition including a vNIC client to the target computing system by:

instantiating a vNIC client in the logical partition as an active backup device for the first logical port, wherein the vNIC client is coupled through the hypervisor of the source computing system to a vNIC server in the source VIOS, and wherein the vNIC server is coupled for I/O data communications to a second source virtual adapter;

decoupling the first logical port from the first source virtual adapter, wherein the vNIC client maintains I/O data communications for the logical partition responsive to the decoupling; and pausing the logical partition on the source computing system;

starting the logical partition on the target computing system;

establishing, by the vNIC client of the logical partition, data communications with the vNIC server of the target VIOS through the hypervisor of the target computing system, including performing I/O data communications between the logical partition and the first target virtual adapter;

establishing a second logical port in the logical partition on the target computing system, including coupling for I/O data communications the second logical port to a second target virtual adapter; and performing I/O data communications from the logical partition to the second target virtual adapter through the second logical port.

2. The method of claim 1, wherein instantiating the vNIC client in the logical partition as the active backup device for the first logical port comprises:

configuring, automatically before migration, the vNIC client with attributes from the first logical port.

3. The method of claim 1, wherein instantiating the vNIC client in the logical partition as the active backup device for the first logical port comprises:

configuring, automatically during migration, the vNIC client with attributes from the first logical port.

4. The method of claim 1, wherein instantiating the vNIC client in the logical partition as the active backup device for the first logical port comprises:

receiving, from an operator of the logical partition, configuration instructions comprising attributes for the vNIC client.

5. The method of claim 1, wherein the virtual adapters are single root input/output virtualization (SR-IOV) adapters, and wherein the first logical port and the second logical ports are SR-IOV virtual function device drivers.

6. The method of claim 1, wherein the source VIOS comprises a third logical port coupled for I/O data communications with the vNIC server.

7. An apparatus for migrating a logical partition with a native logical port from a source computing system to a target computing system, wherein the source computing system includes a hypervisor that supports the logical partition and a source virtual I/O server (VIOS), the logical partition includes a first logical port coupled for I/O data communications to a first source virtual adapter, the apparatus comprising a computer processor, a computer memory operatively coupled to the computer processor, the computer memory having disposed within it computer program instructions that, when executed by the computer processor, cause the apparatus to carry out the steps of:

establishing in the target computing system a target VIOS that includes a virtual network interface controller (vNIC) server, the vNIC server of the target VIOS coupled for data communications to a first target virtual adapter;

copying the logical partition including a vNIC client to the target computing system by:

instantiating a vNIC client in the logical partition as an active backup device for the first logical port, wherein the vNIC client is coupled through the hypervisor of the source computing system to a vNIC server in the source VIOS, and wherein the vNIC server is coupled for I/O data communications to a second source virtual adapter;

decoupling the first logical port from the first source virtual adapter, wherein the vNIC client maintains I/O data communications for the logical partition responsive to the decoupling; and pausing the logical partition on the source computing system;

starting the logical partition on the target computing system;

establishing, by the vNIC client of the logical partition, data communications with the vNIC server of the target VIOS through the hypervisor of the target computing system, including performing I/O data communications between the logical partition and the first target virtual adapter;

establishing a second logical port in the logical partition on the target computing system, including coupling for I/O data communications the second logical port to a second target virtual adapter; and performing I/O data communications from the logical partition to the second target virtual adapter through the second logical port.

8. The apparatus of claim 7, wherein instantiating the vNIC client in the logical partition as the active backup device for the first logical port comprises:

configuring, automatically before migration, the vNIC client with attributes from the first logical port.

9. The apparatus of claim 7, wherein instantiating the vNIC client in the logical partition as the active backup device for the first logical port comprises:

configuring, automatically during migration, the vNIC client with attributes from the first logical port.

10. The apparatus of claim 7, wherein instantiating the vNIC client in the logical partition as the active backup device for the first logical port comprises:

receiving, from an operator of the logical partition, configuration instructions comprising attributes for the vNIC client.

11. The apparatus of claim 7, wherein the virtual adapters are single root input/output virtualization (SR-IOV) adapters, and wherein the first logical port and the second logical ports are SR-IOV virtual function device drivers.

12. The apparatus of claim 7, wherein the source VIOS comprises a third logical port coupled for I/O data communications with the vNIC server.

13. A computer program product for migrating a logical partition with a native logical port from a source computing system to a target computing system, wherein the source computing system includes a hypervisor that supports the logical partition and a source virtual I/O server (VIOS), the logical partition includes a first logical port coupled for I/O data communications to a first source virtual adapter, the computer program product disposed upon a computer readable medium, the computer program product comprising computer program instructions that, when executed, cause a computer to carry out the steps of:

establishing in the target computing system a target VIOS that includes a virtual network interface controller (vNIC) server, the vNIC server of the target VIOS coupled for data communications to a first target virtual adapter;

copying the logical partition including a vNIC client to the target computing system by:

instantiating a vNIC client in the logical partition as an active backup device for the first logical port, wherein the vNIC client is coupled through the hypervisor of the source computing system to a vNIC server in the source VIOS, and wherein the vNIC server is coupled for I/O data communications to a second source virtual adapter;

decoupling the first logical port from the first source virtual adapter, wherein the vNIC client maintains I/O data communications for the logical partition responsive to the decoupling; and pausing the logical partition on the source computing system;

starting the logical partition on the target computing system;

establishing, by the vNIC client of the logical partition, data communications with the vNIC server of the target VIOS through the hypervisor of the target computing system, including performing I/O data communications between the logical partition and the first target virtual adapter;

establishing a second logical port in the logical partition on the target computing system, including coupling for I/O data communications the second logical port to a second target virtual adapter; and performing I/O data communications from the logical partition to the second target virtual adapter through the second logical port.

14. The computer program product of claim 13, wherein instantiating the vNIC client in the logical partition as the active backup device for the first logical port comprises:

configuring, automatically before migration, the vNIC client with attributes from the first logical port.

15. The computer program product of claim 13, wherein instantiating the vNIC client in the logical partition as the active backup device for the first logical port comprises:

configuring, automatically during migration, the vNIC client with attributes from the first logical port.

16. The computer program product of claim 13, wherein instantiating the vNIC client in the logical partition as the active backup device for the first logical port comprises:

receiving, from an operator of the logical partition, configuration instructions comprising attributes for the vNIC client.

17. The computer program product of claim 13, wherein the virtual adapters are single root input/output virtualization (SR-IOV) adapters, and wherein the first logical port and the second logical ports are SR-IOV virtual function device drivers.

* * * * *